United States Patent [19]

Gütle

[11] Patent Number: 5,790,937
[45] Date of Patent: Aug. 4, 1998

[54] METHOD AND APPARATUS FOR THE DISTRIBUTION OF MULTI-MEDIA DOCUMENTS

[75] Inventor: Hubert Gütle, Durbach, Germany

[73] Assignee: Thomson Multimedia S.A., Courbevoie, France

[21] Appl. No.: 495,547

[22] PCT Filed: Feb. 2, 1994

[86] PCT No.: PCT/EP94/00287

§ 371 Date: Jan. 19, 1996

§ 102(e) Date: Jan. 19, 1996

[87] PCT Pub. No.: WO94/18763

PCT Pub. Date: Aug. 18, 1994

[30] Foreign Application Priority Data

Feb. 11, 1993 [EP] European Pat. Off. .............. 93400343

[51] Int. Cl.⁶ .............................. H04N 1/00; H04N 7/00
[52] U.S. Cl. .................. 455/6.3; 348/6; 348/10; 348/460; 348/461; 455/3.1; 455/6.2
[58] Field of Search ....................... 348/5, 6, 7, 8, 348/9, 10, 12, 13, 461–468, 460, 552, 722; 455/3.1, 3.2, 4.1, 4.2, 5.1, 6.1, 6.2, 6.3; H04N 7/10, 7/12, 7/14, 7/16, 7/173, 7/18

[56] References Cited

U.S. PATENT DOCUMENTS 4,787,085  11/1988  Suto et al. .................. 370/110.1
5,173,900  12/1992  Miller et al. ................. 370/110.1

FOREIGN PATENT DOCUMENTS 0435344   7/1991  European Pat. Off. ........ H04L 13/00
0438154   7/1991  European Pat. Off. ........ H04N 7/167
 032656  12/1992  Japan .............................. G11B 20/00
9114265   9/1991  WIPO .............................. G11B 20/10

*Primary Examiner*—Mark R. Powell
*Assistant Examiner*—John W. Miller
*Attorney, Agent, or Firm*—Joseph S. Tripoli; Frederick A. Wein

[57] ABSTRACT

Multi-media documents, in the form of digital signals, are fed into a multiplexer/coder by several sub-channels, which are time multiplexed. A control signal is added and the combined signal is modulated into a transmission signal at the transmitter side. At the receiver side, the transmission signal is processed up to the output of a tuner like a normal signal for television. After the tuner, the signal is demodulated, digitized, demultiplexed, and the control information of the control signal is extracted from the bit stream so that by monitoring said control information signal provided with the transmission, a transmission channel decoder enables a multi-media player to read a distributed document according to the program of the user. Alternately, the signal is directly stored by a multi-media player and the stored signal is demodulated, digitized, demultiplexed and the control information of the control signal is extracted from the bit stream so that by monitoring the control information signal provided with the transmission, a transmission channel decoder controls a reproduction device for reproducing a distributed document according to the programming of the user.

8 Claims, 3 Drawing Sheets

METHOD AND APPARATUS FOR THE DISTRIBUTION OF MULTI-MEDIA DOCUMENTS

BACKGROUND

The present invention relates to simultaneous transmission of several different information via a television channel in the manner of multi-media-distribution and the recording and reproduction of multi-media-documents.

So called multi-media-documents are electronic documents which consists of:

text still pictures graphics digital sound digital video any combination of the above mentioned kinds of data.

It is already known to use picture-in-picture television receivers and video text for providing different information. But the number of different information which may be transmitted by a normal television channel is restricted by bandwidth of television signal.

It is also known a multi-media terminal apparatus which can simultaneously operate a plurality of peripheral equipments connected to other multi-media terminal apparatuses on a network, see EP-A-0 435 344. The multi-media terminal apparatus is connected to other multi-media terminal apparatuses via a transmission line having a plurality of channels.

SUMMARY OF THE INVENTION

Transmission of digital television signals via direct broadcast satelite system (DBS), based on digital compression techniques, is also under development. Such a system can transmit digitally compressed video and audio signals and, optionally, associated control/conditional access data by means of satellite transmission. A large number of transmission channels with a net data rate between 20 to 30 Mbits/sec are provided. To compress video and audio the MPEG I algorithm (motion picture expert group) is used.

Therefore it is the task of this invention to build up a system which enables the distribution, recording and playback of a multiple of multi media documents with low costs.

The invention is based on the idea of using a television channel or parts of the bandwidth of it to distribute simultaneously a multiple of multi media documents, whereas for recording and playback purpose already known devices with additional functionality are used.

The method is that several multi media documents are read into a digital storage device like Compact Disc or in a digital video tape. These digital storage devices serve as a source of digital signals on the sending side. The digital signals are fed in several sub-channels into the multiplexer.

The number of possible subchannels and therefore the number of multi media documents simultaneously distributed is limited by:

the number of available transmission channels the bandwidth of each channel and the bitrate for each subchannel.

For instance the following distribution schemes on one channel are possible: (Assumption channel capacity 23.6 Mbit/sec) Example 1: 16 subchannels at the single Compact Disc (CD) data rate of around 1.4Mbit/s Example 2: 3 tv programs subchannels at 6.8 Mbit/s each plus 2 subchannels with each single CD data rate Example 3: 2 tv program subchannels at 8 Mbit/s each plus 2 subchannels with double CD data rate plus 1 subchannel with single CD data rate.

To transmit several subchannels containing different multi media documents the subchannels are time-multiplexed in the transmission channel.

This has the following advantages:

flexible usage of the overall channel capacity is possible otherwise unused remaining bandwitdh within a channel can be used to transmit multi media documents In accordance with the present invention, there are provided on broadcasting studio side several sub-channels with average bit rates ranging from several kilobits/s up to the whole channel capacity, which are fed into a multiplexer. In the multiplexer the sub-channels are time-multiplexed and a control information is added. Afterwards the data is preferred undergone a channel coding to assure error-free transmission. The final step at the sending side is the modulation into an analogous signal and the emission via the different media, e.g. satellite, cable network or terrestrial distribution.

On the receiving side the signal passes the demodulation, error check and concealment and the demultiplexer after reception via satelite, cable or terestrial. The demodulator treats only one out of several channels simultaneously. The task of the demultiplexer is to separate the different sub-channels in one transmission channel and to extract the control information from the data stream.

As storing devices are two classes possible:

a) A device which records the whole data stream of one channel—this is a digital VCR. The selection between the different subchannels is done at playback time by using the control information included in the bit stream according to the selection of the user.

b) a device which selects and records only one subchannel out of the n subchannels in one transmission channel—this is a disk-based device and called compact disc multi media player.

By monitoring the control information provided with the transmission the transmission channel decoder causes the compact disc multi-media player to record the distributed documents according to the programming of the user.

The transmission channel decoder can be housed in an external box or can be an integrated part of the compact disc multi-media player.

The distribution can be done during the night when free television transmission channels are available or at all times by means of separate channels.

The compact disc multi-media player is a superset of the known CD-I-Player with additional functions. This additional functions are the possibility to use CD-read-only and CD-writeable such as Magneto-Optical-Disc. Further additions are a remote channel interface which offers the possibility for remote storage of multi-media documents on the Magneto-Optical-Disc.

Optionally the compact disc multi-media player is equipped with a smart card reader for access permission or prohibition to the data in the different sub-channels.

A further option is the computer interface for the connection to a computer system.

There are two groups of application in which a compact disc multi-media player can be used.

The first group of applications relates to a first sub-group identical with CD-I-Applications: CD-Digital Audio, CD-Interactive, CD-Photo and CD-ROM and a second sub-group uses the recordable nature of the Magneto-Optical-Disc: CD erasable and the same format as CD, but erasable and recordable and CD for computer use; general purpose high-capacity storage media for personal or home computer.

The second group of applications can be called Electronic Press Applications. Such as there are Electronic Newspapers and Electronic Magazines, catalogues including product information with still pictures or even video sequences, educational software for correspondence course, remote downloading and updating of Point-of-sales and point-of-information stations and remote downloading and updating of databases. It is also based on the recordable nature of the Magneto-Optical-Disc and uses the mass-distribution of multi-media documents with the method described above.

The compact disc multi-media player will be used in the preferable environments:

CDMM and Television and Stereo Set or

CDMM and Personal or Home Computer.

With almost the same cost as for a CD-I-only Player the CD-Multi-Media Player opens the door to far more applications than what is known as CD-Interactive and becomes a Multi-Media platform for both professional and consumer applications.

BRIEF DESCRIPTION OF THE DRAWINGS

More details of the invention will appear through the description of a non-limiting, preferred embodiment illustrated by the accompanying drawings.

In the drawings.

With the multi media system it is for example possible to transmit the content of 3 newspapers, 2 concerts (pure audio) and 2 films simultaneously. Therefore these documents stored in digital form are required at the broadcast studio. For example the newspapers are stored on a computer hard disc, the concerts on digital audio tape and the films on digital video tape.

DESCRIPTION OF THE EMBODIMENT(S)

Embodiment CDMM-Player

Figure 1:
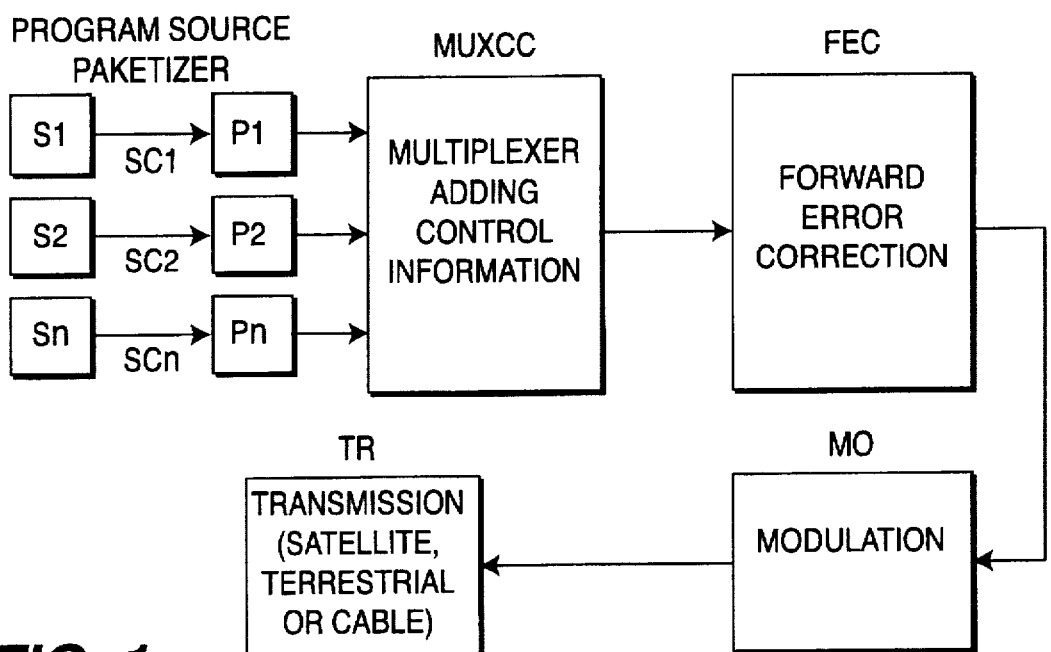
FIG. 1 illustrates the distribution concept at the broadcasting studio side.

According to FIG. 1 on the broadcasting studio side there are provided several sub-channels SC1, SC2 ... SCn with either the single or double CD-data-rate are fed into a multiplexer/coder MUXCC. The CD-data-rate is preferably but not limited to 1.41 Mbit/sec. The whole number of CD-data-rate channels is chosen in respect of the bandwidth of the transmission channel. In the multiplexer/coder MUXCC the sub-channels SC1, SC2 ... SCn are time-multiplexed and control information is added. On the whole, the commands and data of the control channel comprise a document identification, attention that a program will start in y seconds, start of the announced program, end of the program and the encrypting. Certainly this description of the control data is not complete, but lists up the basic features of the control channel. Afterwards the data is undergone a forward error correction FEC to assure error-free transmission. The final step at the sending side is the modulation by modulator MO into an analogous signal and the emission respectively transmission TR via the different media e.g. satellite S, cable network C or terrestrial T distribution.

Figure 2:
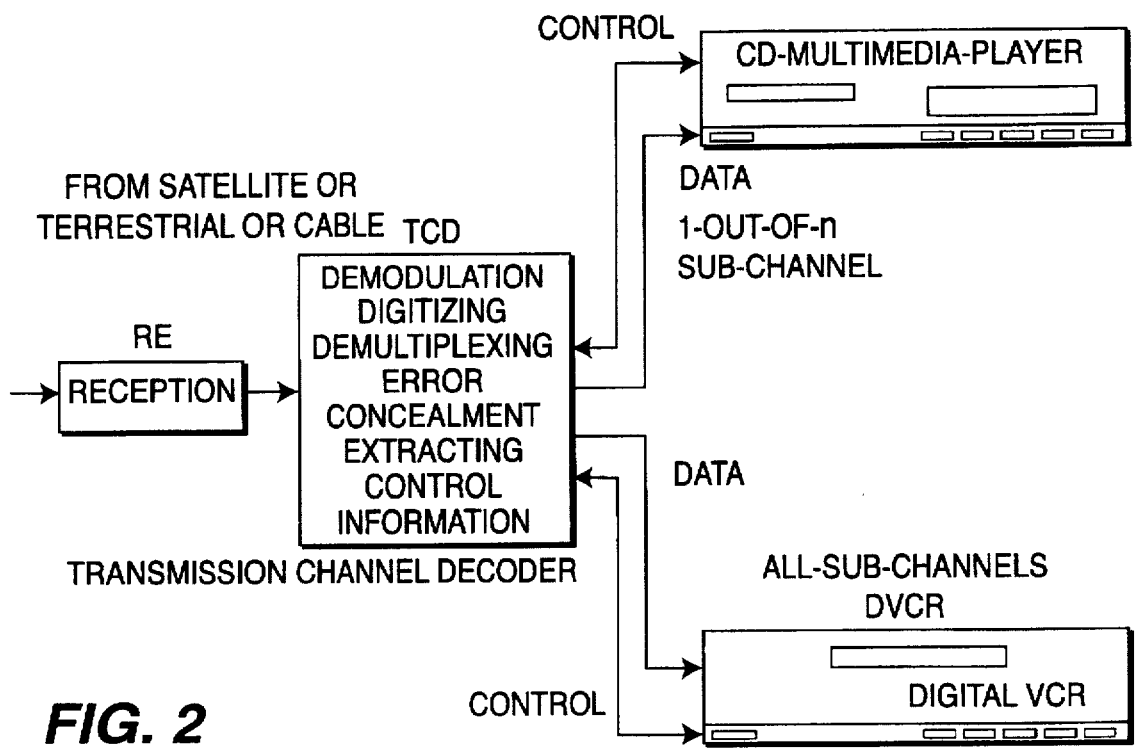
FIG. 2 illustrates the concept at the reception side with the two kinds of storing devices CDMM-Player and digital VCR.

At the receiving side, according to FIG. 2, the signal is fed after reception RE into the transmission channel decoder TCD. In the TCD the signal is demodulated, digitized and demultiplexed. Also a error check and concealment is possible. The control information is extracted from the bit stream. By monitoring the control information provided with the transmission TR the transmission channel decoder TCD causes the compact disc multi-media player CDMM to record the distributed documents according to the programming of the user. Since the compact disc multi-media player CDMM is in a stand-by mode it is necessary to wake it up. This is done by the transmission channel decoder TCD, when it has found a program identification x which matches with the user programming. The number y takes also into account the usage of juke-box-like multi disk players. In the control data there are also means provided to realize an access permission system by encrypting the data at the studio side and by decrypting it with a key on the receiving side.

The transmission channel decoder TCD can be housed in an external box or can be an integrated part of the compact disc multi-media player CDMM.

The distribution can happen during the night when free television transmission channels are available or in separate channels all around the clock.

Figure 3:
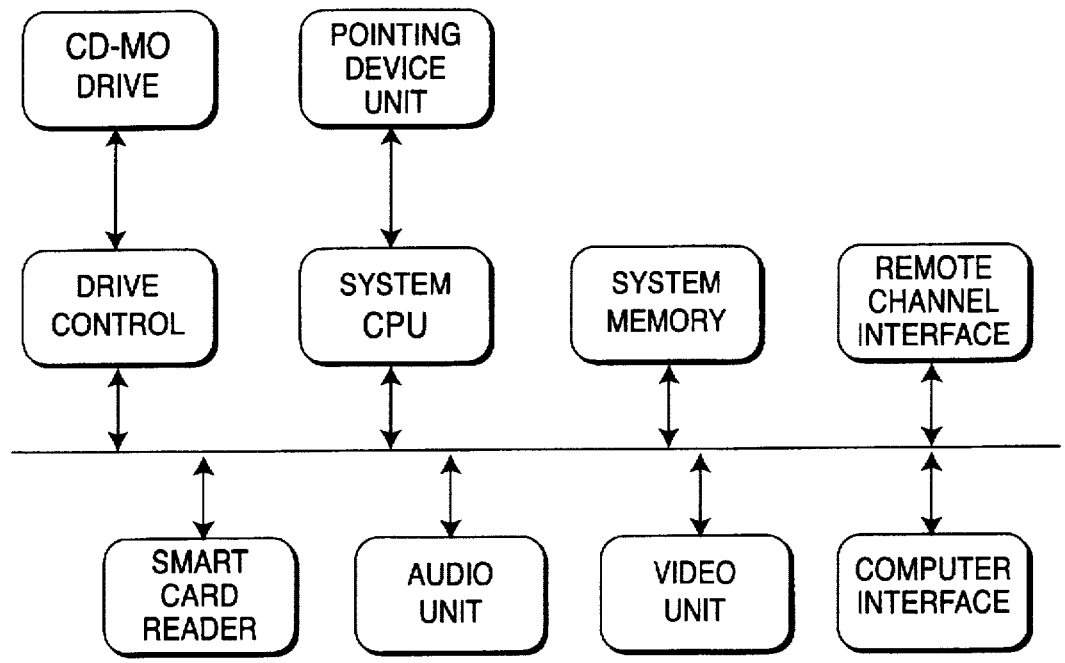
FIG. 3 shows a block diagram of a CDMM-Player.

The compact disc multi-media player CDMM is as shown in FIG.3 a superset of a known CD-I-Player with additional functions. This additional functions are the possibility to use CD-read-only and CD-writeable such as Magneto-Optical-Disc MOD. Further additions are the remote channel interface RCI which offers the possibility for remote storage of multi-media documents on the Magneto-Optical-Disc MOD.

Optionally the compact disc multi-media player CDMM is equipped with a smart card reader SMR for access permission or prohibition to the data in the different sub-channels SC1, SC2, ... SCn.

A further option is the computer interface for the connection to a computer system.

Figure 4:
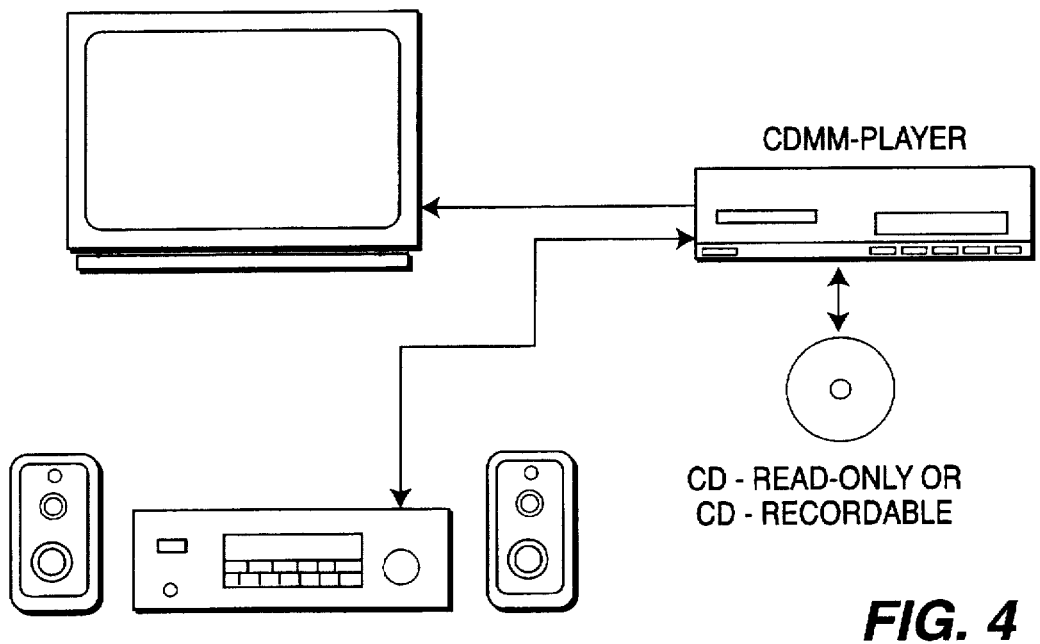
FIG. 4 illustrates a configuration CD-Interactive/Recordable.
Figure 5:
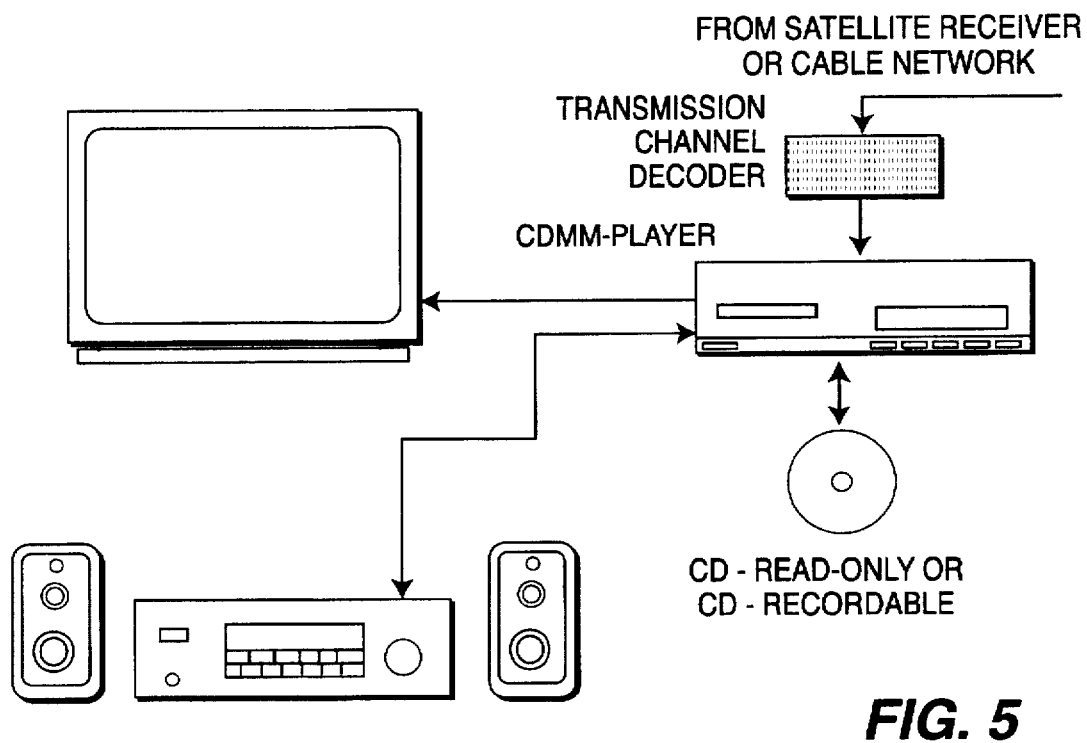
FIG. 5 illustrates a configuration Remote Recording.

As shown in FIG.4 and FIG.5 there are two groups of application in which a compact disc multi-media player CDMM can be used.

The first group of applications relates to a first sub-group identical with CD-I-Applications: CD-Digital Audio, CD-Interactive, CD-Photo and CD-ROM and a second sub-group uses the recordable nature of the Magneto-Optical-Disc MOD: CD erasable and the same format as CD, but erasable and recordable and CD for computer use: general purpose high-capacity storage media for personal or home computer.

The second group of applications can be called Electronic Press Applications. Such e.g. are Electronic Newspapers and electronic Magazines, catalogues including product information with still pictures or even video sequences, educational software for correspondence course, remote downloading and updating of downloading and updating of databases. It is also based on the recordable nature of the Magneto-Optical-Disc MOD and uses the mass-distribution of multi-media documents with the method described above.

The DVCR uses magnetic tape as storage media and therefore this device is able to store data at a data rate which corresponds to one sub-channel up to the date rate of the whole channel.

Figure 6:
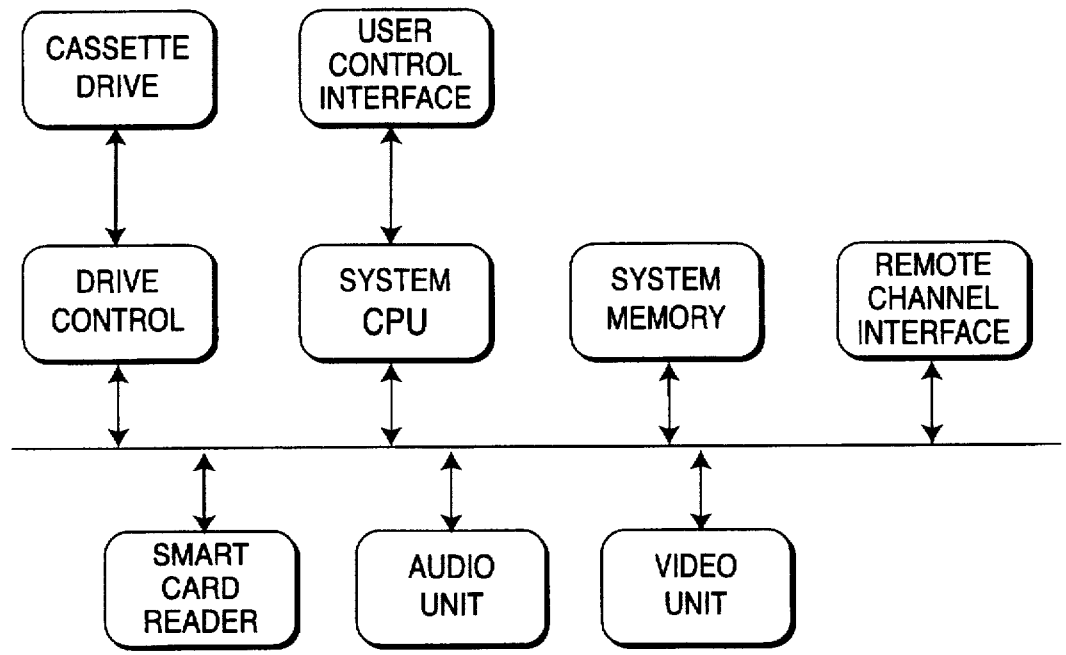
FIG. 6 shows a block diagram of a digital VCR.

Fig. 6 shows the block diagram of a DVCR. The building blocks are similar to that of the CDMM. The physical storage unit is a cassette tape drive.

I claim:

1. A method for distribution of multi-media documents comprising the following steps:

said multi-media documents in the form of digital signals one of said signals is demodulated, digitized, demultiplexed and control information of a digital control signal is extracted from the bit stream so that by monitoring said control information signal provided with the signal, a transmission channel decoder causes a multi-media player to record a distributed document according to the programming of the user, and said signal is directly stored by a multi-media player and said stored signal is demodulated, digitized, demultiplexed and the control information of the control signal is extracted from the bit stream so that by monitoring said control information signal provided with the transmission, a transmission channel decoder causes a reproduction device for reproducing a distributed document according to the programming of the user.

2. The method according to claim 1 wherein said multimedia player is adapted for use as a CD-I-Player and uses the recordable nature of the Magneto-Opitical-Disc.

3. The method according to claim 1 wherein said multimedia player is adapted for use in Electronic Press Applications.

4. The method according to claim 1 wherein said multimedia player is adapted for use with one of a television receiver, a radio receiver and a computer.

5. A system for distribution of multimedia documents in the form of representative digital signals, comprising:

one of means for demodulating a digital control signal and deriving control information from the bit stream of the control signal to enable a multi-media player to record a distributed document according to the programming by the user, and means for storing said control signal by a multi-media player and demodulating said stored signal to derive the control information from the bit stream of the control signal, to enable a reproduction device to reproduce the distributed document according to programming by the user.

6. The system according to claim 5 wherein said multimedia player is used as a CD Player and uses a recordable magneto-optical disc.

7. The system according to claim 5 said multi-media player is adapted for use in Electronic Press Applications.

8. The system according to claim 5 wherein said multimedia player can be coupled to one of a television receiver, a radio receiver, and a computer.

* * * * *